F. L. EIDMANN.
DASHPOT CHECK FOR ELEVATING TRUCKS.
APPLICATION FILED NOV. 26, 1920.
1,409,287.
Patented Mar. 14, 1922.
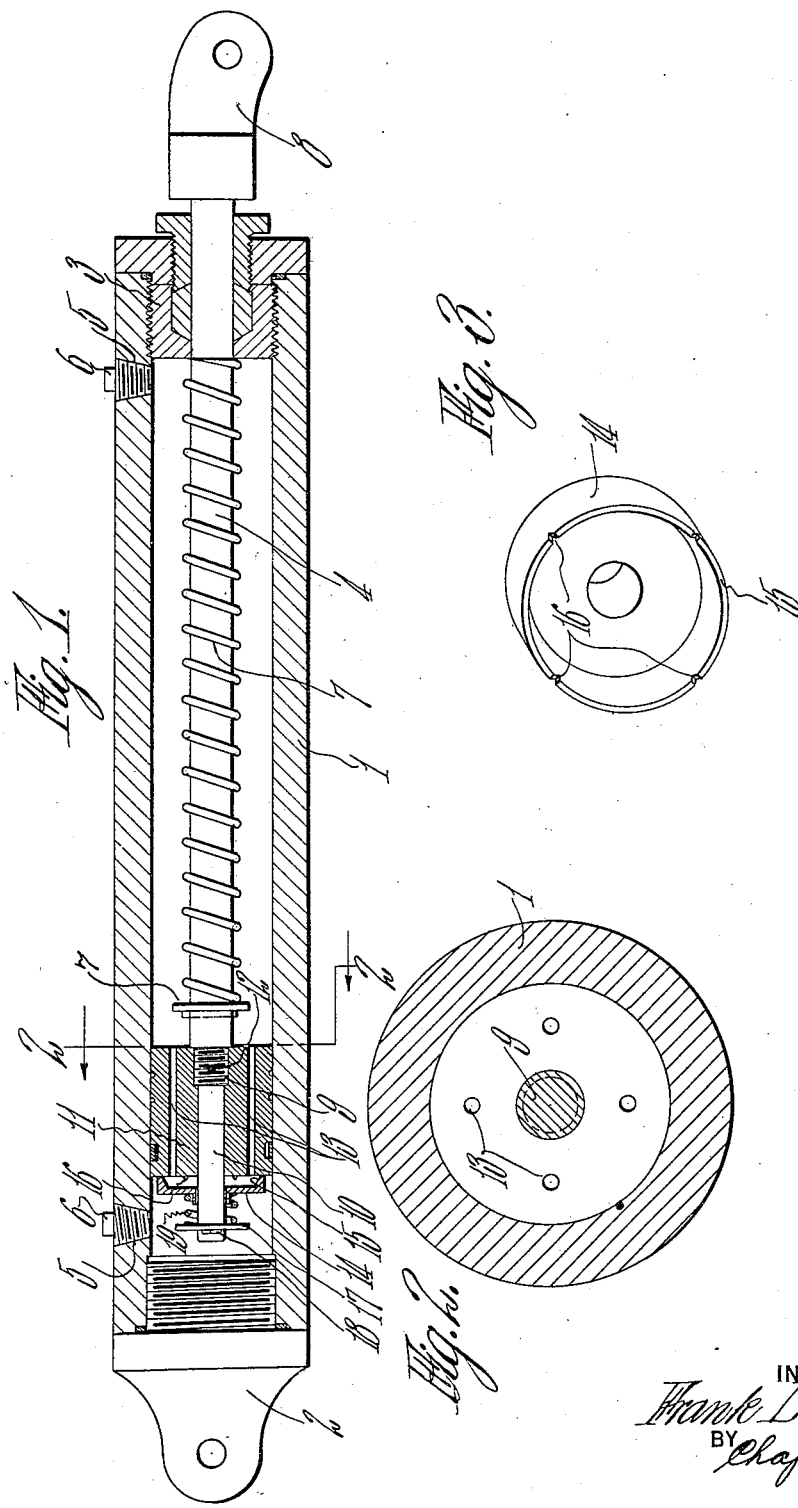

UNITED STATES PATENT OFFICE.

FRANK L. EIDMANN, OF HOLYOKE, MASSACHUSETTS, ASSIGNOR TO EDWARD N. WHITE, J. LEWIS WYCKOFF, AND JAMES M. EATON, ALL OF HOLYOKE, MASSACHUSETTS, TRUSTEES DOING BUSINESS AS COWAN TRUCK COMPANY.

DASHPOT CHECK FOR ELEVATING TRUCKS.

1,409,287.  Specification of Letters Patent.  Patented Mar. 14, 1922.

Application filed November 26, 1920. Serial No. 426,585.

*To all whom it may concern:*

Be it known that I, FRANK L. EIDMANN, a citizen of the United States, residing at Holyoke, in the county of Hampden and State of Massachusetts, have invented new and useful Improvements in Dashpot Checks for Elevating Trucks, of which the following is a specification.

This invention relates to improvements in dash-pot devices and is directed particularly to improvements in the piston and valve mechanism of such devices.

The device is adapted for general application to dash pots or check devices and is especially applicable to dash-pots such as are used in connection with an elevating platform truck as disclosed in the patent to Blackburn, Reissue #14,575, of December 24, 1918.

In trucks or devices of this character, it is desirable to check or retard the lowering or descending movement of the platform when loaded and to eliminate the otherwise rapid descent of the platform. Dash-pots of the type herein concerned consist, in general, of a cylinder containing fluid, such as oil or the like, and a reciprocating piston and rod. The pressure of the piston against the fluid in the cylinder functions to check the descent or movement of the piston while ports or passages are provided through or by the piston to allow the displacement of the fluid by the piston.

It is desirable to permit a more rapid displacement of fluid in the cylinder during the movement of the piston in one direction than in the other. For instance, during an upward movement of a platform in a truck such as above mentioned a free unchecked movement of the piston is desired and for the purpose the piston should have its ports partially closed by valves when moving in one direction and opened wide when moving in the other direction.

An object of the invention is to provide a valve construction that will be uniform and positive in its action and free from disarrangement by dirt and other foreign material.

Other objects and advantages will appear from the following description and appended claims.

The embodiment of the invention as at present preferred is illustrated in the accompanying drawing, in which—

Fig. 1 is a sectional view longitudinally of the dash-pot;

Fig. 2 is an enlarged cross-section on the line 2—2 of Fig. 1; and

Fig. 3 is a perspective view of the valve.

Referring to the drawings more particularly,—a cylinder 1 has in threaded engagement with one end thereof a closing head member 2. A stuffing-box 3 comprising suitable glands, packings, etc., is provided to close the opposite end of the cylinder and is arranged to allow the reciprocation of the piston-rod 4 therein.

Openings 5 are provided adjacent the ends of the cylinder, and pipe plugs 6 or the like are in threaded engagement therewith. These openings allow for the introducing of fluid such as oil or the like into the cylinder and also for draining the cylinder.

The piston-rod 4 may have its shank portion embraced by a coiled spring 7 bearing between a washer 7' on said rod and the stuffing-box 3 so as to normally tend to move the piston to the left (Fig. 1), in other words, to a lowering position of the truck platform (not shown). A coupling member 8 is fixed to the end of the rod 4. The opposite end of the rod has a reduced threaded portion 9 and an extension 10, as shown. The piston 11 is in threaded engagement with the threaded portion 9 of the piston-rod and is secured thereto in a rigid relation by means of a pin 12 or the like. A plurality of openings 13 distributed circumferentially around the axis of the piston are provided in the piston 11 and serve as ports or passages to allow the passage of fluid through or by the piston during the reciprocation thereof.

A cup-shaped valve 14 is mounted loosely upon the piston-rod extension 10 and is provided with a narrow peripheral flange 15 which is adapted to abut the end or face of the piston 11 and to circumscribe the openings 13 of the said piston. A plurality of serrations or notches 16 are provided in the edge of the valve flange 15 and are spaced therearound to allow the passage of fluid therethrough during the displacing movement of the piston.

These notches 16 may be of any size or shape and function to control the flow of fluid past the valve 14, or, rather, allow the displacement of the fluid by the piston and thereby, dependent upon their combined area with respect to the effective area of the piston end, control of the displacement of liquid and the consequent checking or retarding of the piston.

The flange 15 is comparatively narrow in relation to the area of the piston end and provides a minimum bearing surface between it and the piston, and the possibility of foreign matter being caught therebetween is less than would be the case with a valve of the flat-seat type.

A collar 17 carried by the piston-rod extension 10 adjacent the end thereof is held from displacement by a cotter 18, or the like. A coil spring 19 as shown, is disposed between the collar 17 and the valve 14 and is adapted to yieldingly hold the valve flange 15 against the face or end of the piston 11 during the movement thereof to the left in Fig. 1.

In operation and when used in connection with an elevating truck, the device is connected to the same by having the head 2 attached to the truck frame while the rod coupling member 8 is attached to the elevating platform. A raising movement of the platform will cause the piston 11 to move to the right as seen in Fig. 1 and a lowering movement will cause an opposite movement to the left.

The fluid, such as oil or the like, contained within the cylinder is put under pressure by the piston during its movement to the left and the valve is forced against the piston end by pressure of the fluid, whereby the movement is retarded or checked. The notches 16 in the narrow flange 15 permit a restricted passage for the fluid therepast and into and through the openings 13 of the piston. The notches thus permit the displacement of fluid by the piston and, dependent upon their area with respect to the effective area of the piston end, control the downward movement of the piston and rod.

The fluid thus forced through the ports of the during the downward movement, is returned to the compression end of the cylinder during the return or upward movement of the piston. In returning, fluid passes through the ports or passages 13 of the piston and, by reason of the pressure created by the movement of the piston against the fluid, causes the valve 14 to lift against the spring 19 and the passage of fluid is permitted between the valve flange 15 and the end of the piston.

The openings 13 are preferably of such area as to permit the rapid flow of fluid therethrough and a resulting rapid raising movement of the piston. They are so disposed relative to the face or end of the piston that should the device be used in a horizontal place and the cylinder be partially filled, at least one of the openings will be located near the bottom of the cylinder and fluid may pass therethrough immediately upon the return movement of the piston.

By the foregoing arrangement, it is possible to determine with a considerable degree of accuracy the restricted flow of fluid from the left to the right side of the piston and thus control the checking influence of the piston. The notches 16 in the flange of the valve 14 may be enlarged or replaced by smaller notches, as occasion may require, and at all times prevent an uncertain flow of fluid past the valve, as in the case of a flat-disc valve.

While several notches 16 are shown, it is obvious that in some instances one notch may be employed to restrict the flow of liquid from the left side of the piston to the right to control the checking of the piston to any degree desired, dependent upon the area of the notch decided upon.

What I claim is:

1. In a dash-pot, in combination, a cylinder, a piston-rod, a piston carried by the said rod and having a plurality of ports, a cup shaped valve having a notched peripheral flange adapted to abut the face of said piston and circumscribe the said ports therein, and means to hold the said valve in an abutting relation with said piston.

2. In a dash-pot, in combination, a cylinder, a piston-rod, a piston carried by the said rod and having a plurality of ports distributed around the axis of said piston, a cup-shaped valve having a notched peripheral flange adapted to abut the face of said piston and circumscribe the said ports therein, and a spring for yieldingly holding the said valve in an abutting relation with the said piston.

3. In a dash-pot, in combination, a cylinder, a piston, a piston-rod extending through said piston with a short extension beyond said piston, said piston being provided with a plurality of ports, a cup-shaped valve loosely mounted upon the extension of said piston-rod, and having a notched peripheral flange adapted to abut the end of the said piston and circumscribe the ports thereof, a collar fixed upon the extension of said rod adjacent the end thereof, and a compression spring disposed between the said collar and valve to hold the said valve in yielding abutment against the said piston.

In testimony whereof I have affixed my signature.

FRANK L. EIDMANN.